July 23, 1935.  J. S. EDWARDS  2,008,948
DROP WHEEL FOR SEMITRAILERS
Filed Sept. 27, 1934  2 Sheets-Sheet 1
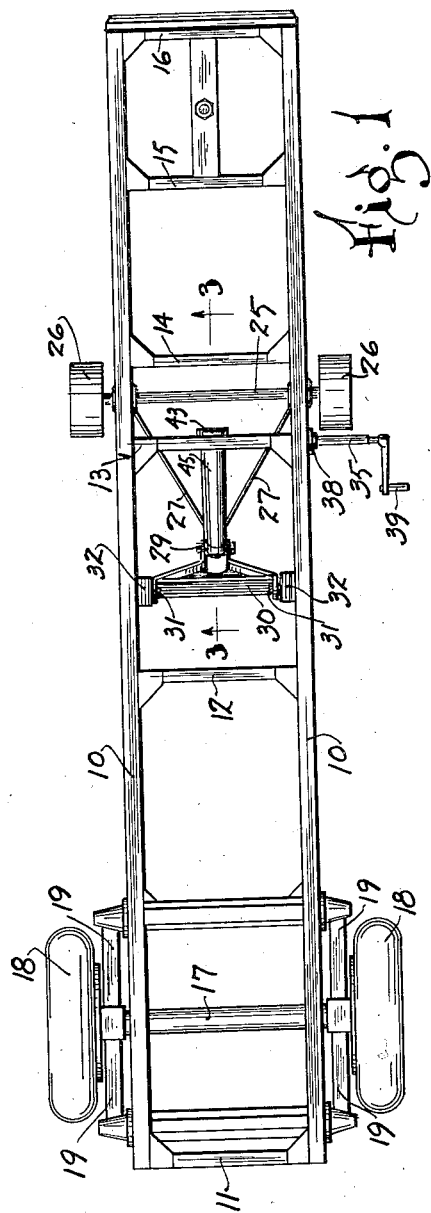
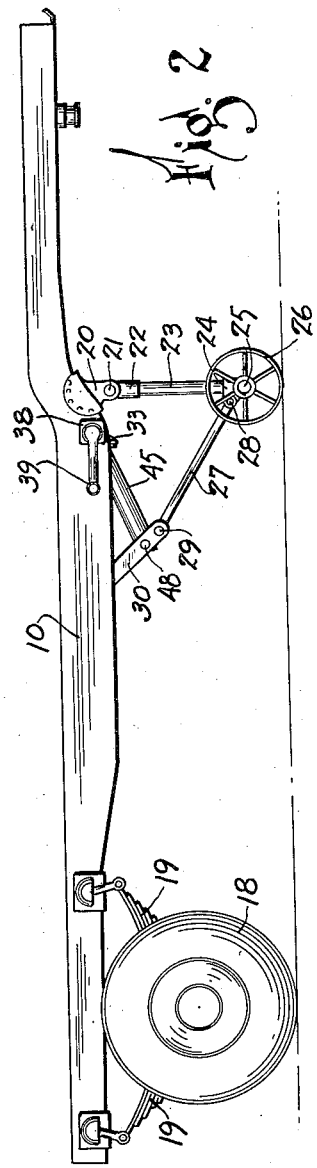
INVENTOR.
JOHN S. EDWARDS.
BY P. M. Pomeroy
ATTORNEY.

July 23, 1935.  J. S. EDWARDS  2,008,948
DROP WHEEL FOR SEMITRAILERS
Filed Sept. 27, 1934  2 Sheets-Sheet 2
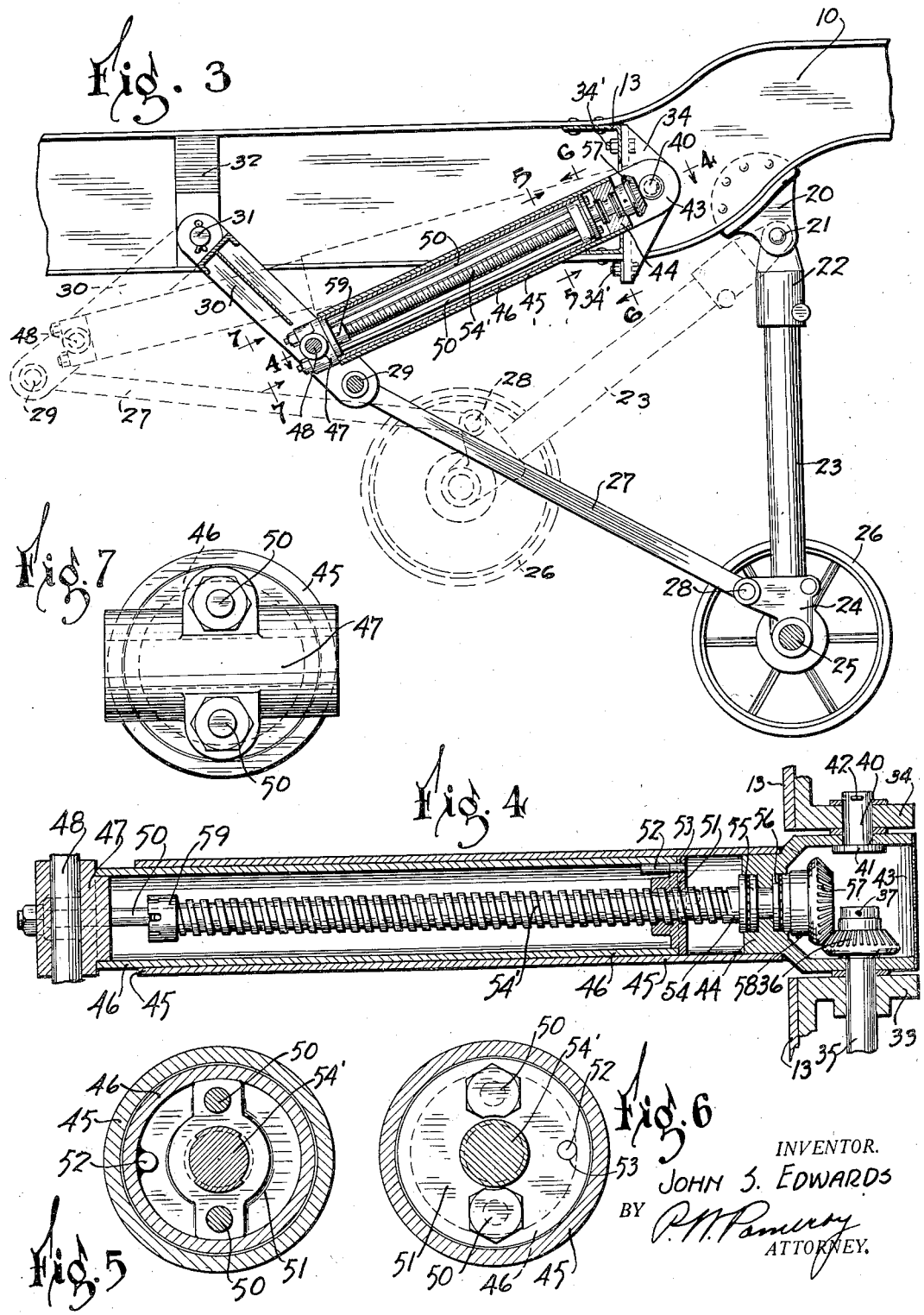
INVENTOR.
JOHN S. EDWARDS
BY
ATTORNEY.

Patented July 23, 1935

2,008,948

UNITED STATES PATENT OFFICE 2,008,948

DROP WHEEL FOR SEMITRAILERS

John S. Edwards, South Bend, Ind., assignor to Edwards Iron Works, Incorporated, South Bend, Ind., a corporation of Indiana Application September 27, 1934, Serial No. 745,788

3 Claims. (Cl. 280—33.1)

This invention relates to semi-trailers and more particularly to the landing gear or drop wheels mounted adjacent to the front end thereof for supporting the trailer when the same is detached from its power source.

The principal object is to provide a manually operated mechanism comprising a minimum number of parts so constructed and arranged that the drop wheels may be readily moved from folded or inoperative position into operative or working position with the minimum of effort on the part of the operator.

A further object is to provide a landing gear that affords a rigidly braced frame extending from the trailer to the ground when the wheels are in operative or working position and which has an enclosed operating screw for operating the wheels.

A still further object is to provide a mechanism which can be readily folded or compacted when not in use and which will be held in such inoperative position without vibration and rattle.

Another object is to provide a manually operated mechanism for raising and lowering the drop wheels for supporting the semi-trailer which comprises a tubular casing supported by the trailer frame in which is telescoped a tube having an operating screw extending thereinto, the respective tubes forming an enclosure for the operating screw.

Other objects, and objects relating to details of construction and methods of operation, will be apparent from the drawings forming a part of this application and the detailed description to follow.

In the accompanying drawings which illustrate a suitable embodiment of my invention and in which like numerals refer to like parts throughout the several views, Fig. 1 is a top plan view of a semi-trailer embodying my invention therein.

Fig. 2 is a side elevational view of a semi-trailer showing the drop wheels in ground-engaging or operative position.

Fig. 3 is an enlarged fragmentary sectional view taken on the line 3—3 of Fig. 1, showing the land gear in full lines in ground-engaging position, and in dotted lines in folded or inoperative position.

Fig. 4 is an enlarged longitudinal sectional view taken on the line 4—4 of Fig. 3, showing the operating screw and the rotating means therefor.

Fig. 5 is an enlarged transverse sectional view taken on the line 5—5 of Fig. 3, showing the operating screw and the nut thereon.

Fig. 6 is an enlarged sectional view taken on the line 6—6 of Fig. 3, showing further details of the nut illustrated in Fig. 5.

Fig. 7 is an end view looking in the direction of the arrows 7—7 of Fig. 3, showing the clamp for attaching the operating screw to one of the toggle members.

The trailer, as illustrated, comprises side frame members 10 suitably connected with cross frame members 11, 12, 13, 14, 15 and 16, and a rear axle 17 carrying road wheels 18 suitably connected to the frame by springs 19. As the trailer construction may be of any standard and suitable design and as the same forms no part of my invention, except the landing gear construction and operating means therefor, a further detailed description of the same is not thought necessary.

The landing gear by which the forward end of the trailer is supported when detached from its source of power, such as a tractor, comprises brackets 20 secured to each of the frame side members 10 which are pivotally connected at 21 to couplings 22 into which are suitably secured depending legs 23. Coupling members 24 secured to the lower end of the legs 23 have suitable bearings therein receiving an axle or shaft 25 having a pair of landing or road wheels 26 rotatably mounted thereon. A pair of links 27 extending upwardly and rearwardly from the coupling members 24 are each pivotally connected thereto at 28. The rearward ends of the links 27 are pivoted at 29 to a swinging bracket 30 which is pivotally supported at its opposite sides at 31 on blocks 32 rigidly secured to the frame side members 10, as best illustrated in Figs. 1 and 3. The links 27 and the swinging bracket 30 comprise a toggle mechanism which with the depending legs 23 and the connection thereon, form a brace for the drop wheels 26 when lowered into operative or ground-engaging position.

A pair of spaced brackets 33 and 34, as best illustrated in Fig. 4, are suitably secured as by bolts 34' to the frame cross member 13. A shaft 35 having a beveled gear 36 secured to the inner end thereof as by a pin 37 extends transversely to the vehicle frame and is suitably journaled to the bracket 33 adjacent to its inner end and in a bearing 38 attached to one of the side frame members 10, thus providing suitable spaced journals therefor. The shaft 35 is provided with a handle 39 secured to the outer end thereof whereby rotation of the handle will rotate the gear 36 for the purpose of swinging the landing wheels 26 to operative or inoperative positions in a manner to be hereinafter described. The bracket 34 has a pin or stud 40 secured therein, the same having a head 41 on the inner end thereof and a pin 42 at the outer end thereof to prevent removal of the stud from the bracket. The pin or stud 40 together with the shaft 35 forms a pivotal support for a hollow head 43 having a reduced end 44 over which is telescoped and secured a tubular casing 45. A second tube 46 telescoped within and supported by the tube 45 has a coupling member 47 secured as by welding in the exposed end thereof, as illustrated in Fig. 4. A shaft 48 carried by the swinging bracket 30 is pivotally connected with the coupling head 47 on the tube 46. The coupler head 47 which is preferably made in two parts is maintained in position on the shaft 48 by the bolts 50 which preferably extend the length of the tube 46 through a nut 51 secured in the inner end of the tube 46 so that the bolts 50 form the dual purpose of supporting the nut 51 in the tube 46 and clamping the coupler head on to the shaft 48. As a further means of preventing rotation of the nut 51 relative to the tube 46, I preferably weld or otherwise secure a pin or stud 52 to the inner face of the tube 46 which has its outer end projecting through a hole 53 drilled into the nut 51. The reduced head 44 on the member 43 is bored to provide a journal for the shaft 54 having a screw 54' formed on the end thereof and thrust bearings 55 and 56 therefor. A beveled gear 57 secured to the shaft 54 outwardly of the bearings 56 by any suitable means as by a pin 58 meshes with the beveled gear 36 secured to the shaft 35. I also provide a stop member 59 secured to the free end of the screw 54 to limit the outward and inward travel of the tube 46.

Referring particularly to Figs. 3 and 4, it will be observed that when the operator rotates the shaft 35 by the handle 39, the beveled gear 36 will be caused to rotate therewith, thus causing a rotation of the beveled gear 57 in mesh therewith, thus rotating the shaft 54 and screw thereon, causing the nut 51 to move along the screw 54' to swing the bracket 30 on its pivots 31, thus moving the links 27 therewith to operate upon the drop wheel supporting structure, causing the drop wheels to be raised or lowered, depending upon the direction in which the shaft 35 is rotated. It will also be observed that the screw 54' is entirely enclosed within the tubes 45 and 46 so that the same may be properly lubricated and that no dirt or foreign matter can reach the screw thereby wearing away the operating parts or causing difficult turning of the same.

Although the tubes 45 and 46 are shown as being round in cross section, my invention is not so limited as other shapes may be used without affecting the operation thereof.

While I have shown one embodiment of my invention, it will be apparent from the foregoing description that I have provided an operating means for the drop wheels for semi-trailers which consists of a minimum number of parts, which is easy to operate, and which with the toggle forming the brace member for the ground wheels is effective in accomplishing the result sought, and while the drawings and description are to be taken as illustrative only, it will be understood that various changes in details of construction and methods of operation may be resorted to without departing from the spirit and substance of my invention, the scope of which is to be measured entirely by the sub-joined claims.

What I claim is:

1. In a semi-trailer having a frame, a depending support therefor pivotally connected to said frame, means to swing said support to operative and inoperative positions comprising, a driving shaft journaled in said frame, a tube pivotally supported on said shaft, a second tube telescopically fitted in said first tube, a nut fixed against rotation in said second tube, a screw enclosed in said tubes rotatably operated by said driving shaft to move said second tube longitudinally in said first tube, and means pivotally connecting said second tube and support whereby said second tube is maintained against rotation and whereby rotation of said screw will swing said support to operative and inoperative positions.

2. In a semi-trailer having a frame, a depending support therefor pivotally connected to said frame, a brace for said support, means to swing said support to operative and inoperative positions comprising, a driving shaft journaled in said frame, a tube, means supporting said tube having a journal formed therein and pivotally supported by said shaft, a second shaft having a screw formed thereon supported in said journal, a second tube telescopically fitted and slidable within said first tube, a nut on said screw, means within said second tube fixing said nut against rotation on said screw, means operatively connecting the exposed end of said second tube and said brace, and gears on said driving shaft and second shaft for rotating said screw to slide said second tube to swing said support to said operative and inoperative positions.

3. In a semi-trailer having a frame, a depending support therefor pivotally connected to said frame, a brace for said support, means to swing said support to operative and inoperative positions comprising, a driving shaft, a tube, means supporting said tube having a journal formed therein and pivotally supported by said shaft, a second shaft having a screw formed thereon supported in said journal, a second tube telescopically fitted within said first tube, a coupling member on the exposed end of said second tube connecting said tube and brace, a nut on said screw at the enclosed end of said second tube, means extending through said second tube maintaining said coupling member and nut against movement relative to said tube, and gears on said driving shaft and second shaft for rotating said screw to slide said second tube to swing said support to said operative and inoperative positions.

JOHN S. EDWARDS.